United States Patent
Stickel

(10) Patent No.: US 8,358,922 B2
(45) Date of Patent: Jan. 22, 2013

(54) FLUID HEATING DEVICE, CONTINUOUS FLOW HEATER, AND METHOD FOR THE PRODUCTION THEREOF

(75) Inventor: Martin Stickel, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1387 days.

(21) Appl. No.: 10/581,531

(22) PCT Filed: Dec. 2, 2004

(86) PCT No.: PCT/EP2004/053248
§ 371 (c)(1), (2), (4) Date: Feb. 16, 2007

(87) PCT Pub. No.: WO2005/055665
PCT Pub. Date: Jun. 16, 2005

(65) Prior Publication Data
US 2007/0241100 A1    Oct. 18, 2007

(30) Foreign Application Priority Data
Dec. 4, 2003 (DE) ................. 103 56 790

(51) Int. Cl.
*F24H 1/10* (2006.01)

(52) U.S. Cl. ......... 392/491; 392/465; 392/492; 392/494
(58) Field of Classification Search ................. 392/465, 392/491, 492, 494
See application file for complete search history.

(56) References Cited

U.S. PATENT DOCUMENTS

| | | | |
|---|---|---|---|
| 941,215 A * | 11/1909 | Wade | 392/494 |
| 4,334,141 A | 6/1982 | Roller et al. | |
| 4,343,988 A * | 8/1982 | Roller et al. | 392/467 |
| 4,511,789 A * | 4/1985 | Goessler et al. | 219/448.11 |
| 4,697,068 A * | 9/1987 | Schreder | 219/448.19 |
| 4,888,465 A | 12/1989 | Hoffmann | |
| 4,940,886 A * | 7/1990 | Kircherer et al. | 219/451.1 |

(Continued)

FOREIGN PATENT DOCUMENTS

| | | |
|---|---|---|
| DE | 71 32 663 | 2/1972 |
| DE | 197 32 414 | 2/1999 |
| DE | 198 45 219 | 4/2000 |

(Continued)

OTHER PUBLICATIONS

International Search Report PCT/EP2004/053248.

*Primary Examiner* — Thor Campbell
(74) *Attorney, Agent, or Firm* — James E. Howard; Andre Pallapies

(57) ABSTRACT

A fluid heating device is provided that is to be mounted in a continuous flow heater and includes at least one heating element embodied as an electric resistance heater, and at least one heat exchanging element that is connected in a heat-conducting manner to the heating element and the fluid so as to transfer the heat generated by the heating element to the fluid. The heat exchanging element forms an integral housing component of a pressure-resistant and temperature-resistant continuous flow heater and is provided with an essentially planar central area on which the heating element is mounted. In order to produce a continuous flow heater, the heating device is joined in a positive, pressure-resistant, and thermally stable manner to a molded part encompassing at least one inlet and at least one outlet so as to form a fluid chamber.

31 Claims, 4 Drawing Sheets

U.S. PATENT DOCUMENTS

Figure 1:
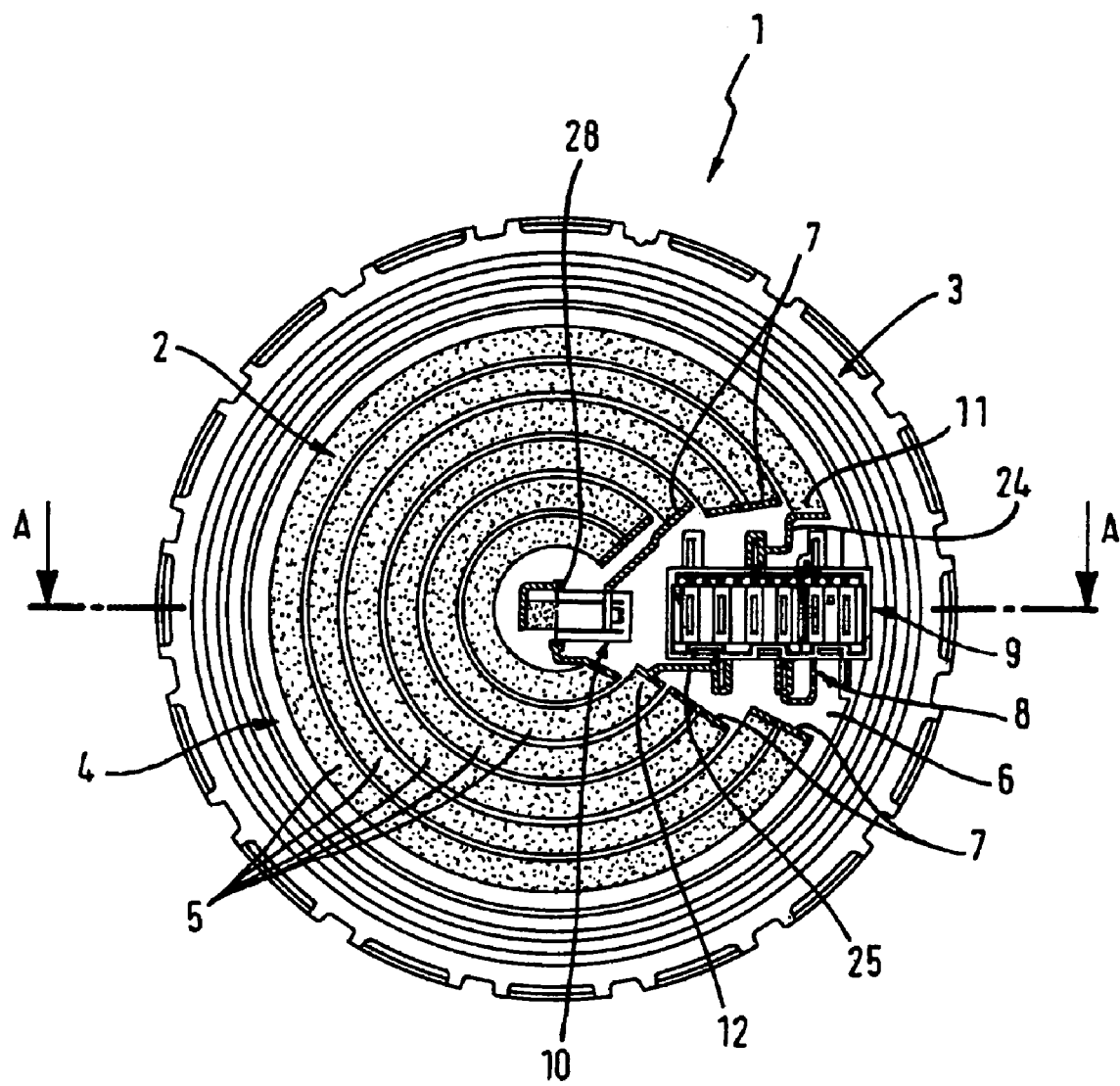

| | | | |
|---|---|---|---|
| 5,557,704 A | 9/1996 | Dennis et al. | |
| 6,442,341 B1 | 8/2002 | Wu | |
| 6,816,670 B1 * | 11/2004 | Renau | 392/467 |
| 6,825,555 B2 * | 11/2004 | Hiramatsu et al. | 257/705 |
| 2002/0011480 A1 * | 1/2002 | Schilling et al. | 219/448.11 |
| 2004/0026411 A1 | 2/2004 | Mucke et al. | |
| 2004/0074893 A1 * | 4/2004 | Wermbter et al. | 219/465.1 |
| 2004/0207072 A1 * | 10/2004 | Hiramatsu et al. | 257/705 |

FOREIGN PATENT DOCUMENTS

| | | |
|---|---|---|
| DE | 198 52 888 | 5/2000 |
| EP | 1 070 922 | 1/2001 |
| EP | 1 152 639 | 11/2001 |
| GB | 2 193 563 | 2/1988 |
| GB | 2 324 014 | 10/1998 |
| GB | 2 350 734 | 12/2000 |

* cited by examiner

FLUID HEATING DEVICE, CONTINUOUS FLOW HEATER, AND METHOD FOR THE PRODUCTION THEREOF

The application relates to a heating device for fluids for mounting in a continuous flow heater, comprising at least one heating element embodied as an electric resistance heater and at least one heat exchanging element which is connected in a heat-conducting manner to the heating element and the fluid so as to transfer the heat generated by the heating element to the fluid. The application further relates to a continuous flow heater comprising a heating device of the aforesaid type. The invention further relates to a method for producing the aforesaid heating device and the continuous flow heater.

Heating devices and continuous flow heaters of said type are used, for example in dishwashing machines or washing machines. Nowadays, heating devices based on tubular heaters are predominantly used for heating fluids. Tubular heaters usually consist of a resistance wire which is disposed centrally in a stainless steel tube so that no dielectric breakdowns can occur thereon. For precisely fixing the resistance wire in the centre of the tube and for improving the insulation, the space between the resistance wire and the stainless steel tube is filled with a insulating material, usually a magnesium oxide powder.

Tubular heaters can be used in various ways. These can be arranged in continuous flow heater through which fluid flows, for example, so that they lie in the fluid stream. The tubular heater can be arranged on a fluid guiding tube through which fluid flows, optionally with a heat exchanging element interposed. Another simple variant provides that the tubular heater is located inside a container and can be washed with the fluid.

A feature common to all the variants described is that the heating device has a certain inertia as a result of the design of the tubular heater. The low powers per unit surface of the tubular heater which can be achieved, result in large component dimensions. Problems frequently also arise with the contacting of the tubular heater and other appurtenant components such as a switching element, for example, which is designed to prevent dry running of the heating device of the continuous flow heater.

A continuous flow heater of this type with a complex sealing system and an integrated monitoring unit in the form of a microswitch to protect against dry running can be deduced, for example, from DE 36 26 955 C2.

Furthermore, known from DE 199 34 319 A1 is a heating device for fluids comprising at least one heating element embodied as an electrical resistance heater which has a heat transfer element which is in thermally conducting connection with the heating element and the fluid for transferring the heat generated by the heating element to the fluid. The heating device described therein is a fluid guiding tube on the outside of which the heating element is applied in the form of a thick-layer element. The configuration of the continuous flow heater in the form of a fluid-guiding tube on the one hand has the disadvantage of large dimensions and on the other hand, exhibits a considerable lack of flexibility with regard to the electrical connections and the arrangement of the fluid inlet or fluid outlet.

It is thus the object of the present invention to provide a heating device, a continuous flow heater and a method for the production thereof which allows the fluid to be heated in an energy-saving manner and has a simple and cost-effective structure.

The objects are achieved by a heating device having the features of claim 1, by a continuous flow heater having the features of claim 11, by a method for producing a heating device according to the features of claim 13 and by a method for producing a continuous flow heater having the features of claim 18. Advantageous embodiments are obtained respectively from the dependent patent claims.

In contrast to DE 199 34 319 A1 where the heating device forms the continuous flow heater, in the invention the heat exchanging element of the generic heating device forms an integral housing component of a pressure-resistant and temperature-resistant continuous flow heater and has a substantially planar central area on which the heating element is mounted. The heating device comprising the heating element and the heat exchanging element is thus merely a component of a continuous flow heater which has at least one other component.

In order to form a closed heating system which is embodied in the form of a continuous flow heater, the heating device according to the invention is connected to a moulded part in a pressure-resistant and thermally stable manner to form a fluid chamber. The moulded part has at least one inlet and at least one outlet. It is further provided to arrange the heating element outside the fluid chamber on the heat exchanging element. The complete system of the continuous flow heater thus consists of at least two components, namely the heating plate according to the invention and a moulded part connected thereto, which is also designated as housing.

The fact that the heat exchanging element has a substantially planar central area on which the heating element is mounted in the form of an electrical resistance heater, e.g. a thick layer element, has the advantage of simple manufacture. The heating element is mounted on the heat exchanging element or applied thereto. A heating element of this type usually comprises a resistance heating track which is laid (for example by printing or flame spraying) on an insulating substrate, e.g. made of glass, ceramic or a glass ceramic, which is itself provided on the heat exchanging element. During the fabrication of a printed heating element, the insulating substrate is initially laid on the central area of the heating device in a sequence of printing and heating steps. The resistance heater is then applied to this layer, e.g. by film or screen printing and heated further. Fabrication is consequently particularly simple since the central area is embodied as substantially planar, In the arrangement disclosed in DE 199 34 319 A1 on the other hand, the electrical resistance heater must be applied to a curved surface, which makes manufacture more difficult.

In the heating device according to the invention, the thickness of the heat exchanging element can be reduced compared with using a tubular heater so that the heat transfer thereby to the fluid is improved. This has the advantage that the temperature of the electrical resistance heater can be reduced since the heat is guided more efficiently away therefrom to the fluid. The reduction in the temperature of the electrical resistance heater allows the power density of the heating device to be increased and consequently its size reduced for a given maximum permissible temperature. The heating device is preferably constructed as circular since this is to be joined to a moulded part in a pressure-resistant and thermally stable manner to form a continuous flow heater. In this case, it is possible to reduce the diameter. On the one hand, this means a cost saving and on the other hand, an increase in reliability since the smaller the diameter of the heating device, the more easily this can withstand the pressures produced.

The heating element preferably comprises a number of electrically interconnected heating sections which substantially cover the entire central area, but a mounting area is left through the heating sections. The fact that the heating element covers the largest possible area of the central area of the heat exchanging element makes it possible to have minimal heating device dimensions. The electrically interconnected heating sections are preferably embodied in the form of concentric circular segments. The opposite ends of the respective circular segments are spaced apart from one another so as to form a mounting area. Adjacent ends of the circular segments can be interconnected, for example, by an electrically conductive material in the form of conductor tracks. The construction of the heating element in the form of a plurality of heating section and their electrical connection as desired especially allows flexible guidance of the connecting ends of the heating elements. The heating elements need not necessarily have the form of concentric circular segments. A spiral profile would naturally also be feasible. The choice of method of forming the heating sections (straight, quadrilateral, curved) is substantially dependent on the shape of the heating device and especially the heat exchanging element.

The preferred material for the electrical resistance heater is a material having a resistance with a positive temperature coefficient. This means that the electrical resistance heater restricts any overheating up to a certain extent if the fluid chamber runs dry or is switched-on when dry. Such a material is, for example, nickel.

Whereas tubular heaters can only be implemented in one power stage because of the principle, i.e. two tubular heaters must be built into a continuous flow heater to achieve two different heating stages simultaneously, the heating element of the heating device according to the invention can also have more than one heating circuit by electrical connection of corresponding heating sections.

In a further advantageous embodiment, there is provided a temperature monitoring device disposed on the heat exchanging element which is in good heat-conducting connection with the heat exchanging device. The temperature monitoring element is preferably disposed in the mounting area adjacent to the heating element. In contrast to the arrangement proposed in DE 199 34 319 A1, where the temperature monitoring device is intended to be connected to the heating element in a good heat-conducting manner, this is not desired in the present invention. For this reason, the temperature monitoring device is preferably disposed in the mounting area which has no heating sections. The temperature monitoring device substantially serves to detect the fluid temperature. An indirect conclusion on the behavior of the heat conductor can then be drawn therefrom.

To avoid any influence of the temperature monitoring device by the heating element, the heat exchanging element is preferably made of a material which has poor heat conduction in the lateral direction. In a direction perpendicular thereto, however, the heat exchanging element exhibits good thermal conductivity whereby on the one hand, efficient heating of the fluid is ensured and on the other hand, the fluid temperature at the temperature monitoring device can be indirectly inferred. Stainless steel can especially be considered as material for the heat exchanging element.

The temperature monitoring element is preferably formed by an NTC resistance. This makes it possible to evaluate its signal by simple electronics since it already exhibits fairly large variations in resistance under fairly small temperature fluctuations. An NTC resistance can also be applied simply to the heat exchanging element as a surface-mountable component.

It is further preferred to provide a contacting device disposed on the heat exchanging element which is electrically connected to the electrical elements of the heating device. The electrical elements are on the one hand the heating element and on the other hand, the temperature monitoring device. It is unimportant whether the heating device comprises a plurality of heating circuits. All the electrical connecting ends of the heating element and the electrical contacts of the temperature monitoring device are electrically connected to a contacting device disposed on the heat exchanging elements, especially in the mounting area. Thus, the heating device can be connected to the electrical power supply by a single plug contact and all the electrical consumers required for monitoring the heating device can be contacted by means of this contacting device.

As has been described further above, in addition to the heating device, the continuous flow heater according to the invention has at least one moulded part which has at least one inlet and at least one outlet. In this case, it is preferred that the temperature monitoring element is disposed on the heat exchanging element of the heating device in an area situated close to the inlet in the moulded part. It is hereby possible to precisely detect the fluid temperature of the fluid flowing to the continuous flow heater in a particularly simple manner.

The method according to the invention for producing the device described above comprises the following steps:
  providing a semi-finished product having poor lateral thermal conductivity;
  forming a substantially flat heat exchanging element from the semi-finished product having an inner surface and an outer surface and a substantially planar central area;
  applying a heating element embodied as an electrical resistance heater to the central area of the heat exchanging element leaving a mounting area; and
  applying a temperature monitoring device to the mounting area so that this is not influenced by the heating element during operation of the continuous flow heater.

This method has the same advantages as have been explained hereinbefore in connection with the device.

In particular, it is provided that the temperature monitoring device is applied directly to the heat exchanging element in order to provide a temperature value which is substantially uninfluenced by the heating element during operation of the heating device.

In a further embodiment, the method comprises the further step of applying a contacting device to the heat exchanging element and electrically connecting to the electrical elements of the heating device.

It is further preferred if the heating element and the temperature monitoring device are applied to the same side of the heat exchanging element. In principle, it is thereby possible to arrange the heating element and the temperature monitoring device on the inner or the outer surface of the heat exchanging element. In this case, the inner surface is defined such that after joining together with the moulded part, this is situated in the fluid chamber. The outer surface on the other hand does not come in contact with the fluid. It is most preferred that the heating element and the temperature monitoring device together with the contacting device are mounted on the outer surface of the heat exchanging element. In this case, the electrical contacting of these three elements to one another is configured particularly simply.

The method according to the invention for producing a continuous flow heater comprises the steps of producing a heating device as has been described above, producing a moulded part with at least one inlet and at least one outlet, positively joining the heating device and the moulded part so that the assembly is pressure-resistant and thermally stable after joining together. The moulded part whose dimensions must be matched to the dimensions of the heating device is preferably made of plastic. As a result, this can be fabricated particularly simply by an injection moulding technique.

In order to produce a good seal to prevent loss of fluid, the step of joining together the heating device and moulded part involves inserting a sealing ring therebetween.

Further advantageous embodiment and exemplary embodiments of the heating device according to the invention and the continuous flow heater according to the invention are described hereinafter.

Figure 2:
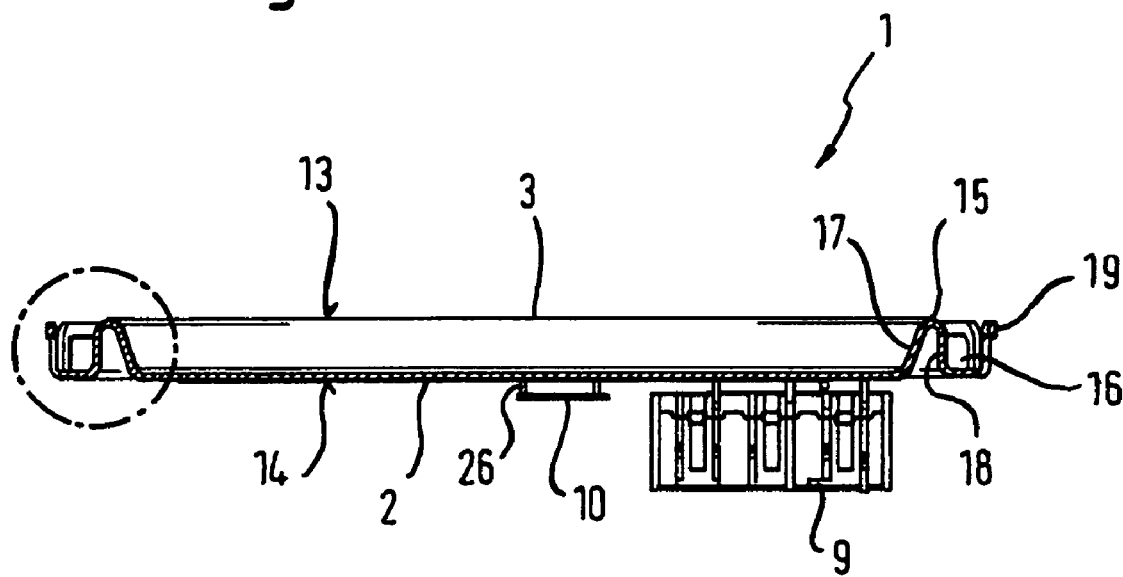
Figure 3:
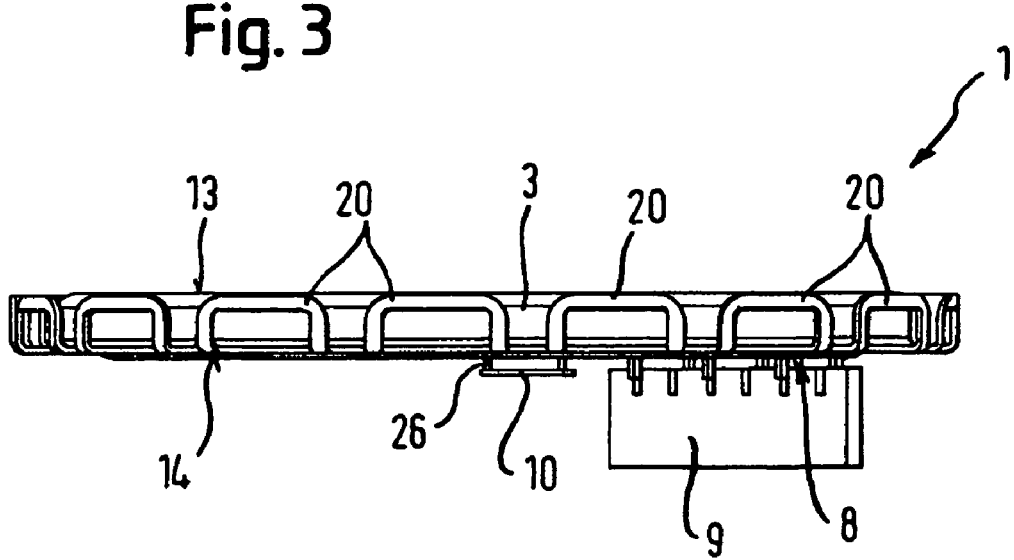
Figure 4:
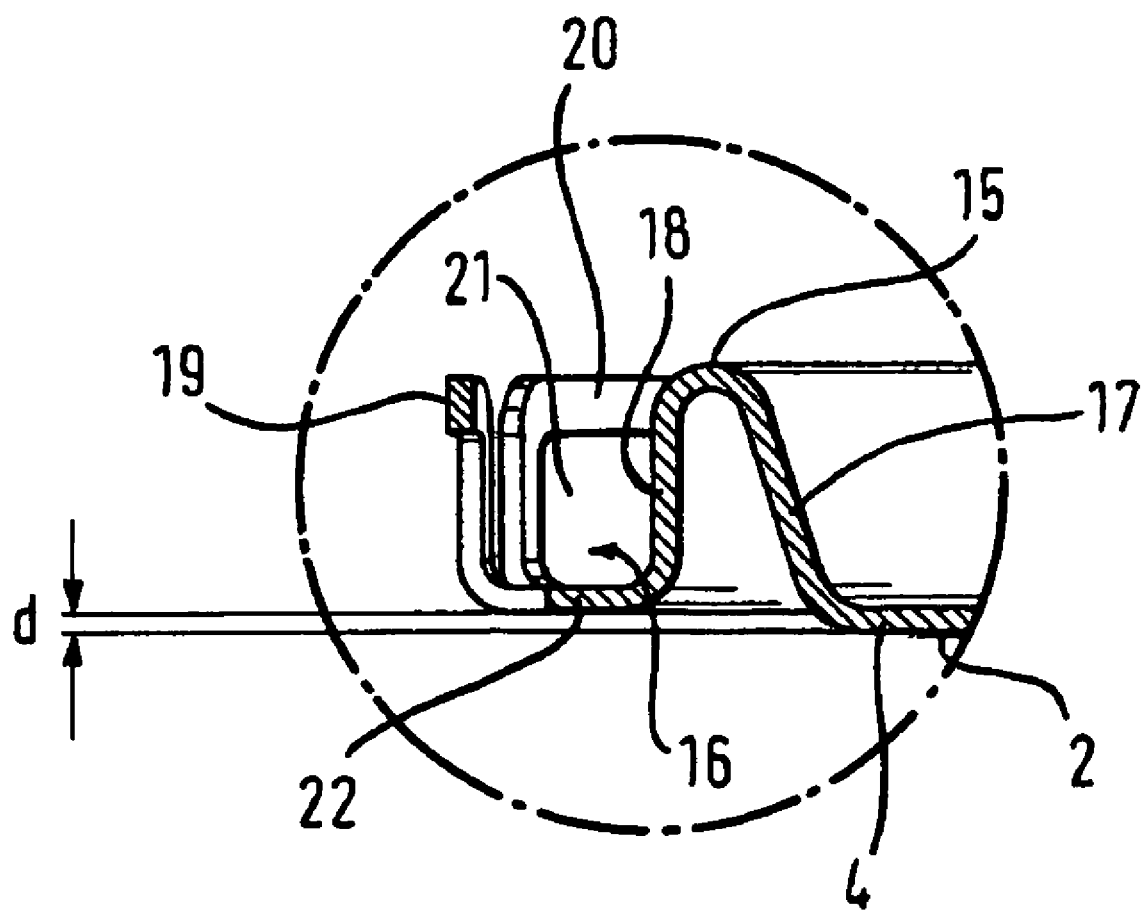
Figure 5:
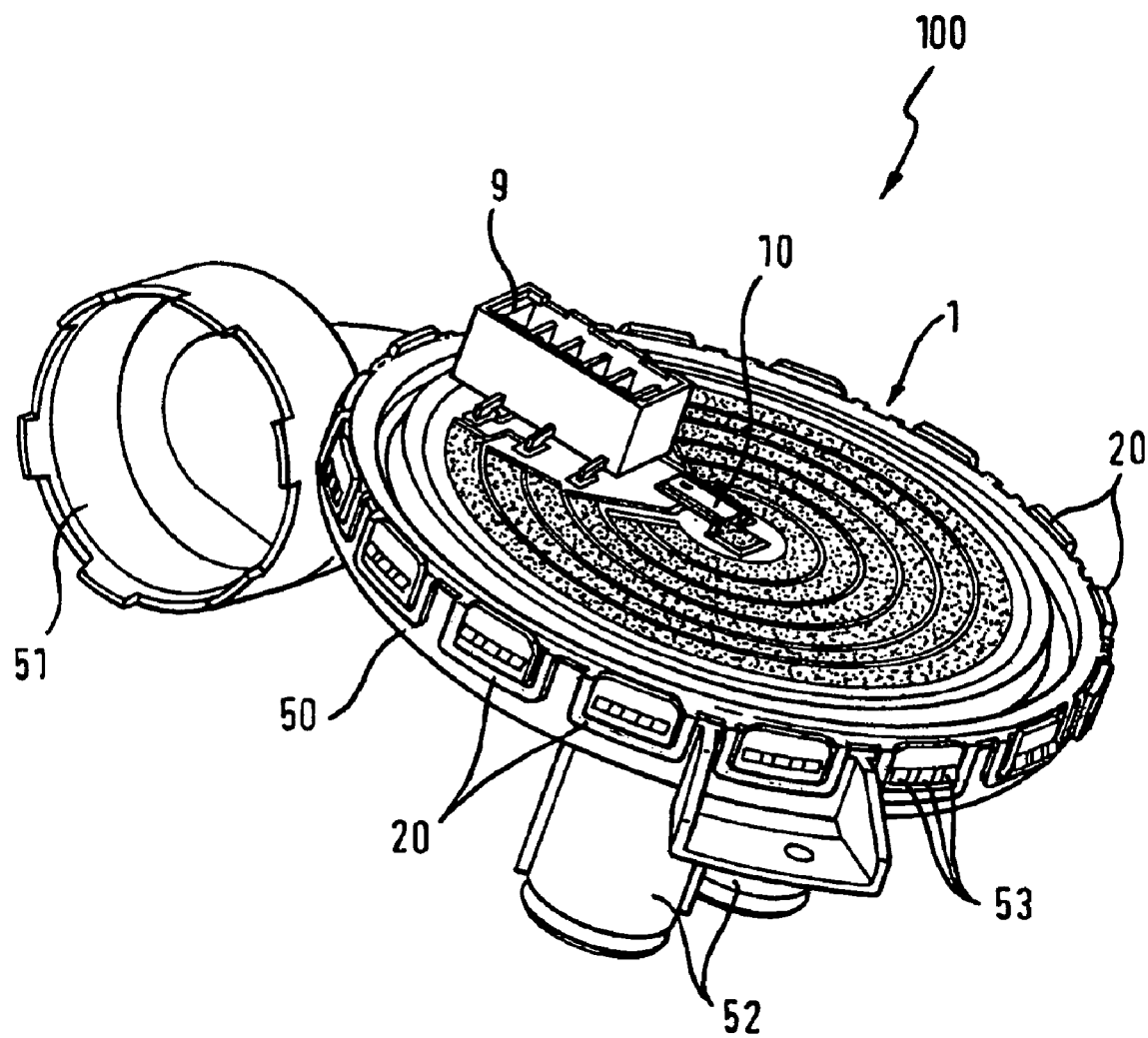

FIG. 1 is a plan view of the outer surface of a heating device according to the invention, FIG. 2 is a section through the heating device from FIG. 1 along the line A-A, FIG. 3 is a side view of the heating device according to the invention, showing this in its subsequent built-in position with the outer surface at the bottom, FIG. 4 is a detailed view of the edge of the heating device encircled by the dashed line in FIG. 1 and FIG. 5 is a perspective view of a continuous flow heater according to the invention composed of a heating device and a moulded part.

A heating device according to the invention is described hereinafter with reference to FIGS. 1 to 4.

FIG. 1 shows a heating device 1 according to the invention in a plan view of its outer surface 14. The heating device 1 has a substantially circular shape. A heating element 2 is disposed on a central area 4 of a heat exchanging element 3, e.g. made of a stainless steel. The heating element 2 consists, for example, of a total of seven circular concentric circular segments, each forming a heating section 5. The heating sections 5 are arranged with respect to one another so that adjacent ends of the circular segments are brought into electrical connection with one another by means of a short conductor track 7. The single heating circuit in this case thus extends from one connecting end 11 over the outermost concentric ring and each of the other concentric rings as far as a further connecting end 12.

The heating element 2 of the present heating device 1 has a single heating circuit. In other words, all the heating sections 5 of the heating element 2 are serially interconnected by corresponding conductor track sections 7. A component of this heating circuit is a fuse 10 which is located substantially at the centre of the central area 4 in which the heating segments 5 have the smallest radii and can be seen more clearly from the cross-sectional views in FIGS. 2 and 3. FIGS. 2 and 3 show the heating device 1 in its subsequent built-in position, e.g. in a dishwasher or a washing machine. The built-in position is defined such that the outer surface 14 on which are located the heating element 2, the fuse 10, another temperature monitoring device 8 described subsequently and the contacting device 9, is facing downwards. The inner surface 13 which is in contact with the fluid, on the other hand, is arranged at the top. The fuse 10 should prevent any damage to the heating element 2 in the event of the heating element running dry, by connecting ends 26 of the fuse melting at contact points 28 which are connected to the conductor track 7 of the heating circuit by means of solder. As a result of the small radii of the heating segments, current concentrations which promote triggering of the fuse are formed in this area. As a result of its built-in position, the separation of the contact points 28 in the event of melting of the solder can be assisted by gravity.

The heat exchanging element is made of metal, for example, a stainless steel which has poor thermal conductivity in the lateral direction. Perpendicular thereto, i.e. in a plane perpendicular to the plane of the drawing, however, the heat exchanging element exhibits good thermal conductivity so that the energy produced by the heating element is efficiently transferred to the fluid.

Whereas the heating element, i.e. the heating sections embodied as an electrical resistance heater, have a positive temperature coefficient, a temperature monitoring device 8 having a negative temperature coefficient is provided in a mounting area 6. The temperature monitoring device 8, which is embodied as an NTC resistance for example merely detects the temperature of the fluid flushing around the inner surface 13 but not the heat produced by the heating element 2 because of the properties of the heat exchanging element 3. The temperature monitoring device 8 is thus decoupled from the heating element.

Despite the temperature monitoring device being decoupled from the heating element, the behavior of the heating element can be inferred since the temperature of the fluid flushing around the inner side of the heat exchanging element is detected and evaluated. Using an NTC resistance as a temperature monitoring device has the advantage that it is very much simpler to evaluate the delivered signal compared with a PTC resistance. In contrast to an NTC resistance, a PTC resistance requires strong temperature gradients to be able to detect a sufficient change in the resistance.

A contacting device 9 is arranged in the mounting area 6 which is left free by the heating element 2 in the central area 4 of the heat exchanging element 3. The connecting ends 11 and 12 of the heating element 2 are electrically connected by the contacting device 9 by means of respective conductor tracks 24 and 25. In its interior the contacting device 9 has corresponding contact tongues by which means it can be connected mechanically and electrically to a correspondingly constructed plug. The required voltage and the required current is supplied to the heating element 2 by means of the contacting device 9.

The temperature monitoring device is located in the immediate proximity of the contacting device 9 and is electrically connected thereto. All the electrical consumers provided in the heating device can thereby be contacted by means of a single plug contact by means of the contacting device.

The design of the heat exchanging device 3 can be seen more clearly from the cross-sectional view in FIG. 2 which shows a section along the line A-A from FIG. 1 and the side view in FIG. 3. The central area 4 is surrounded by a circumferential edge 15. The edge 15 is formed by a wall 17 which extends from the central area 4 upwards at an angle, and a channel wall 18 which runs downwards from the edge 15. The channel wall 18 is part of a channel 16 which also has an outer channel wall 19 and a channel bottom 22. The channel 16 which runs around the central area outside the edge 15 serves to receive a wall section of the moulded part to attach the heating device to the moulded part in a pressure-resistant and thermally stable manner. The channel wall 19 is formed by a row of lugs 20 for receiving locating hooks formed in the wall section of the moulded part 50 of a continuous flow heater 100 according to the invention (FIG. 5).

As can be seen more clearly from the enlarged detail view of the edge of the heat exchanging element 3 in FIG. 4, the channel walls 18 and 19 are arranged substantially parallel to one another and substantially perpendicular to the plane formed by the central area 4. The channel bottom does not extend in any case underneath the central area 4. The distance d is thus 0 in the limiting case or, as shown, greater than 0. In other words, the connecting element (for example, channel bottom 22) that connects to a corresponding connecting feature of the continuous flow heater does not cross a plane that intersects and is parallel to the central area. This allows the heating element 2, especially the heating sections 5 to be applied in a simple manner to the outer surface 14 of the central area 4 by a printing method.

The wall 17 running at an angle from the central area to the edge 15 could also be constructed as perpendicular to the central area 4 and thus run substantially parallel to the channel walls 18 and 19. The geometry of the metal plate can be formed, for example, by a stamping process in which the lugs 20 are formed, and embossing. The inner channel wall 18 provides a seating which allows a radial seal between the heating device and the moulded part. As a result of the built-in position of the heating device shown in FIGS. 2 to 4 with the outer surface 14 at the bottom, the edge also forms a water barrier in conjunction with the channel 16 which prevents any fluid escaping in the event of a leak in the continuous flow heater, from running onto the heating element 2. The channel bottom 23 thus forms a drip-off edge onto which the escaping fluid can drip before it can reach the edge 15 serving as a water barrier.

The lugs formed in the outer channel wall 19 each have a recess 21 which extends from the outer channel wall 19 in the direction of the channel bottom 22. This design ensures that the heating device 1 can be securely engaged to the moulded part 50.

FIG. 5 shows a perspective view of the continuous flow heater 100 according to the invention, showing the heating device 1 with a moulded part 50 associated therewith. The moulded part 50, which consists of a plastic for example has a radially oriented inlet 51. Two axially extending outlets 52 are furthermore provided. Each of the outlets 52 can be connected to a separate spray device of a dishwashing machine. The arrangement of the inlets and outlets can naturally also be made at positions differing from those shown in the figure.

The engagement between the heating device 1 and the moulded part 50 can also be seen from the perspective view in FIG. 5. The engagement is made by means of the aforementioned lugs 20 which engage in locating hooks 53 and which prevent the moulded part 50 from becoming detached from the heating device 1 even under pressure. It cannot be seen from the diagram that a sealing ring is disposed between the moulded part 50 and the heating device 1. More precisely, the sealing ring is disposed between a wall of the moulded part extending into the channel 16 and the inner channel wall 18, thereby ensuring good tightness even under pressure, i.e. under possible deformation, especially of the moulded part but also of the heating device.

The fluid chamber formed in the interior between the heating device and the moulded part has no flow resistances such as is the case in tubular heaters, for example located inside a fluid chamber. For this reason, in a continuous flow heater according to the invention, the pumping capacity can be reduced since fewer flow losses need to be compensated. Costs can be saved with a smaller pump. On the other hand, higher pressures can be achieved with the pumps used hitherto so that the mechanical stressing of items for washing is increased.

The continuous flow heater according to the invention has a very small number of parts overall and can be produced particularly simply. In particular, the measures needed to produce a secure seal are very much smaller since only a single sealing ring needs to be provided between the heating device and the moulded part. It is no longer necessary to provide switches acted upon mechanically by the fluid to determine dry running. This can be determined merely by the temperature monitoring device provided outside the fluid chamber.

In addition, the electrical contact of the continuous flow heater according to the invention is simplified substantially by means of a contacting device which is in electrical contact with all the electrical consumers.

Reference List
1 Heating device
2 Heating element
3 Heat exchanging element
4 Central area
5 Heating section
6 Mounting area
7 Conductor track
8 Temperature monitoring device
9 Contacting device
10 Fuse
11 Connecting end
12 Connecting end
13 Inner surface
14 Outer surface
15 Edge
16 Channel
17 Wall
18 Channel wall
19 Channel wall
20 Lug
21 Recess
22 Channel bottom
23 Edge of recess
24 Conductor track
25 Conductor track
27 Heating device
28 Contact point
29 Conductor track
30 Conductor track
50 Moulded part
51 Inlet
52 Outlet
53 Locating hook
54 Central area
55 Wall
56 Projection
57 Seal
58 Wall (inner area)
59 Reinforcement
60 Fluid chamber
100 Continuous flow heater
d Distance

The invention claimed is:

1. A heating device for fluids, the heating device being adapted for mounting to a corresponding part of a continuous flow heater, the heating device comprising:
   at least one heating element configured as an electric resistance heater;
   at least one heat exchanging element for the exchange of heat between the heating element and a fluid, the heat exchanging element being connected in a heat-conducting manner to the heating element and the fluid so as to transfer the heat generated by the heating element to the fluid and the heat exchanging element forming an integral housing component of a pressure-resistant and temperature-resistant continuous flow heater and having a substantially planar central area on which the heating element is mounted; and
   connection portions arranged at a periphery of the heating device,
   wherein the heating device is adapted for mounting as an integral unit to the corresponding part to form the continuous flow heater, and
   the connection portions are adapted to engage connection parts on the corresponding part to hold the heating device and the corresponding part together.

2. The heating device according to claim 1, wherein the heating element comprises a plurality of electrically interconnected heating sections that substantially cover the entire central area except for a mounting area, the mounting area providing an area for mounting a temperature monitoring device.

3. The heating device according to claim 2, wherein the heating element includes at least one heating circuit through electrical connection of corresponding heating sections.

4. The heating device according to claim 1, wherein the heating element is formed from a material having a positive temperature characteristic (PTC).

5. The heating device according to claim 1 and further comprising a temperature monitoring device disposed on the heat exchanging element that is in good heat-conducting connection with the heat exchanging element.

6. The heating device according to claim 5, wherein the heating element comprises a plurality of electrically interconnected heating sections that substantially cover the entire central area except for a mounting area, the mounting area providing an area for mounting through the heating sections and the temperature monitoring element is disposed in the mounting area adjacent to the heating element.

7. The heating device according to claim 5, wherein the temperature monitoring element is formed by an NTC resistance.

8. The heating device according to claim 1 and further comprising a contacting device disposed on the heat exchanging element that is electrically connected to the electrical elements of the heating element.

9. The heating device according to claim 8, wherein the contacting device is electrically connected to each heating circuit of the heating element and the temperature monitoring device.

10. The heating device according to claim 1, further comprising a connecting element located at a periphery of the heating device, the connecting element being adapted to connect to a corresponding connecting feature of the continuous flow heater,
wherein the connecting element does not cross a plane that intersects and is parallel to the central area.

11. The heating device according to claim 1,
wherein the connection portions are lugs and the connection parts are hooks.

12. A heating device for fluids, the heating device being adapted for mounting thereof in a continuous flow heater, the heating device comprising:
at least one heating element configured as an electric resistance heater; and
at least one heat exchanging element for the exchange of heat between the heating element and a fluid, the heat exchanging element being connected in a heat-conducting manner to the heating element and the fluid so as to transfer the heat generated by the heating element to the fluid and the heat exchanging element forming an integral housing component of a pressure-resistant and temperature-resistant continuous flow heater and having a substantially planar central area on which the heating element is mounted,
wherein the heat exchanging element consists of a material that exhibits a first thermal conductivity in a first direction in which heat is to flow from the heating element to the fluid and a second thermal conductivity in a second direction perpendicular to the first direction, the first thermal conductivity being greater than the second thermal conductivity.

13. A continuous flow heater comprising:
a heating device including:
a heating element;
at least one heat exchanging element for the exchange of heat between the heating element and a fluid, the heat exchanging element being connected in a heat-conducting manner to the heating element and the fluid so as to transfer the heat generated by the heating element to the fluid, the heat exchanging element forming an integral housing component of a pressure-resistant and temperature-resistant continuous flow heater and having a substantially planar central area on which the heating element is mounted, and the heat exchanging element being in direct contact with the fluid; and
connection portions arranged at a periphery of the heating device; and
a molded part separate from the heating device and connected positively to the heating device in a pressure-resistant and thermally stable manner to form a fluid chamber, the molded part having at least one inlet and at least one outlet,
wherein the heating device is mounting as an integral unit to the molded part to form the continuous flow heater, and
the connection portions engage connection parts on the molded part to hold the heating device and the molded part together.

14. The continuous flow heater device according to claim 13 and further comprising a temperature monitoring device disposed on the heat exchanging element of the heating device in an area situated close to the inlet in the molded part.

15. The continuous flow heater device according to claim 13, further comprising a mounting area within the central area, the mounting area having a temperature monitoring device mounted therein.

16. The continuous flow heater according to claim 13,
wherein the connection portions are lugs and the connection parts are hooks.

17. A method for producing a heating device for fluids, the method comprising the steps of:
a. providing a semi-finished product;
b. forming a substantially flat heat exchanging element from the semi-finished product having an inner surface and an outer surface and a substantially planar central area;
c. applying a heating element embodied as an electrical resistance heater to the central area of the heat exchanging element leaving a mounting area; and
d. applying a temperature monitoring device to the mounting area so that the temperature monitoring device is not influenced by the heating element during operation of the continuous flow heater,
wherein the semi-finished product has a first thermal conductivity in a first direction in which heat is to flow from the heating element to the fluid and a second thermal conductivity in a second direction perpendicular to the first direction, the first thermal conductivity being greater than the second thermal conductivity.

18. The method according to claim 17, wherein applying a temperature monitoring device to the mounting area includes applying the temperature monitoring device directly to the heat exchanging element.

19. The method according to claim 17 and further comprising applying a contacting device to the heat exchanging element and electrically connecting to the electrical elements of the heating device.

20. The method according to claim 17, wherein the heating element and the temperature monitoring device are applied to the same side of the heat exchanging element.

21. The method according to claim 17, wherein the heating element and the temperature monitoring device together with the contacting device are applied to the outer surface of the heat exchanging element.

22. The method according to claim 17, further comprising providing lugs arranged at a periphery of the heating device, wherein the lugs are adapted for engaging hooks on a corresponding part, the heating device being adapted for mounting as an integral unit to the corresponding part to form a continuous flow heater.

23. A method for producing a continuous flow heater comprising the steps:
   a. producing a heating device including at least one heating element configured as an electric resistance heater and at least one heat exchanging element for the exchange of heat between the heating element and a fluid, the heat exchanging element being connected in a heat-conducting manner to the heating element and the fluid so as to transfer the heat generated by the heating element to the fluid, the heat exchanging element coming into direct contact with the fluid, and the heat exchanging element forming an integral housing component of a pressure-resistant and temperature-resistant continuous flow heater and having a substantially planar central area on which the heating element is mounted, the heating device having connection portions arranged at a periphery of the heating device;
   b. producing a molded part separate from the heating device with at least one inlet and at least one outlet, the molded part having connection parts for engaging the connection portions of the heating device to hold the heating device and the molded part together; and
   c. positively joining the heating device and the molded part so that the assembly is pressure-resistant and thermally stable.

24. The method according to claim 23, wherein joining together the heating device and molded part includes inserting a sealing ring therebetween.

25. The method according to claim 23, further comprising providing a mounting area within the central area, the mounting area having a temperature monitoring device mounted therein.

26. The method according to claim 23, wherein the connection portions are lugs and the connection parts are hooks, and the lugs engage the hooks in the positively joining step.

27. A dishwasher for washing items, the dishwasher comprising:
   a container for retaining items to be washed;
   a heating device including:
      a heating element;
      at least one heat exchanging element for the exchange of heat between the heating element and a fluid, the heat exchanging element being connected in a heat-conducting manner to the heating element and the fluid so as to transfer the heat generated by the heating element to the fluid, and the heat exchanging element forming an integral housing component of a pressure-resistant and temperature-resistant continuous flow heater and having a substantially planar central area on which the heating element is mounted;
      a mounting area within the central area;
      a temperature monitoring device mounted within the mounting area so that the temperature monitoring device is not influenced by the heating element during operation of the continuous flow heater; and
      connection portions arranged at a periphery of the heating device: and
   a corresponding part having connection parts,
   wherein the heating device is mounting as an integral unit to the corresponding part to form the continuous flow heater, and
   the connection portions engage the connection parts on the corresponding part to hold the heating device and the corresponding part together.

28. The dishwasher according to claim 27, wherein the connection portions are lugs and the connection parts are hooks.

29. A dishwasher for washing items, the dishwasher comprising:
   a container for retaining items to be washed; and
   a continuous flow heater having a heating device and a molded part, the heating device including a heating element and at least one heat exchanging element for the exchange of heat between the heating element and a fluid, the heat exchanging element being connected in a heat-conducting manner to the heating element and the fluid so as to transfer the heat generated by the heating element to the fluid, the heat exchanging element being in direct contact with the fluid, and the heat exchanging element forming an integral housing component of a pressure-resistant and temperature-resistant continuous flow heater and having a substantially planar central area on which the heating element is mounted, and the molded part being separate from the heating device and connected positively to the heating device in a pressure-resistant and thermally stable manner to form a fluid chamber, the molded part having at least one inlet and at least one outlet,
   wherein the heating device has connection portions arranged at a periphery of the heating device, and
   the molded part has connection parts that engage the connection portions of the heating device to hold the heating device and the molded part together.

30. The dishwasher according to claim 29, further comprising a mounting area within the central area, the mounting area being for mounting a temperature monitoring device.

31. The dishwasher according to claim 29, wherein the connection portions are lugs and the connection parts are hooks, and the heating device and the molded part are positively connected by the lugs engaging the hooks.

\* \* \* \* \*

UNITED STATES PATENT AND TRADEMARK OFFICE
CERTIFICATE OF CORRECTION

PATENT NO.       : 8,358,922 B2
APPLICATION NO. : 10/581531
DATED            : January 22, 2013
INVENTOR(S)      : Martin Stickel Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1992 days.

Signed and Sealed this
First Day of September, 2015

Michelle K. Lee
*Director of the United States Patent and Trademark Office*